(12) United States Patent
Sturman et al.

(10) Patent No.: US 6,237,617 B1
(45) Date of Patent: May 29, 2001

(54) ISOLATED PROPORTIONAL VALVE

(75) Inventors: Oded E. Sturman; Benjamin Grill, both of Woodland Park, CO (US)

(73) Assignee: Sturman BG, LLC, Woodland Park, CO (US)

( * ) Notice: Subject to any disclaimer, the term of this patent is extended or adjusted under 35 U.S.C. 154(b) by 0 days.

(21) Appl. No.: 09/268,945

(22) Filed: Mar. 16, 1999

(51) Int. Cl.⁷ .................................................. F16K 31/42
(52) U.S. Cl. ......................... 137/1; 60/432; 60/477; 137/625.66; 251/25
(58) Field of Search ................. 60/477, 432; 251/25; 137/1, 625.66

(56) References Cited

U.S. PATENT DOCUMENTS

| | | | |
|---|---|---|---|
| 2,276,591 | * 3/1942 | Ray | 60/432 |
| 2,399,294 | * 4/1946 | Ray | 60/432 |
| 2,751,753 | * 6/1956 | Ray | 60/432 |
| 2,885,860 | * 5/1959 | Ray | 60/432 |
| 3,120,103 | * 2/1964 | Beard et al. | 60/432 X |
| 3,175,500 | * 3/1965 | Zeigler | 60/432 X |
| 3,200,591 | * 8/1965 | Ray | 60/432 |
| 3,505,814 | * 4/1970 | Beard et al. | 60/432 X |
| 4,054,155 | * 10/1977 | Hill | 251/25 X |
| 4,247,077 | * 1/1981 | Banick et al. | 251/25 |
| 4,458,487 | * 7/1984 | Kojima et al. | 60/477 |
| 4,463,773 | * 8/1984 | Kojima et al. | 251/25 X |
| 5,598,871 | * 2/1997 | Sturman et al. | 137/625.65 |
| 5,758,862 | * 6/1998 | Sturman | 251/25 |

* cited by examiner

Primary Examiner—Gerald A. Michalsky
(74) Attorney, Agent, or Firm—Blakely, Sokoloff, Taylor & Zafman LLP

(57) ABSTRACT

Herein is provided an improved proportional fluid control valve. The proportional valve includes a fluid valve that controls the flowrate of an output fluid. The fluid valve is coupled to a pressure chamber of the control valve. The position of the fluid valve, and the corresponding flowrate of the output fluid, can be varied by changing the pressure of a working fluid within the pressure chamber. The pressure within the pressure chamber can be increased by a piston that pumps working fluid from a reservoir to the chamber. The piston is coupled to a first solenoid and a spring that move the piston in a reciprocating pumping motion. The pressure of the working fluid within the pressure chamber can be decreased by opening a bleeder valve that allows working fluid to flow from the pressure chamber back to the reservoir. The bleeder valve is coupled to a second solenoid and a spring that open and close the valve. The first and second solenoids are connected to a controller that generates digital signals which energize the solenoids and move the piston and bleeder valve, accordingly. The controller can move the fluid valve and vary the output fluid flowrate by energizing the solenoids and either increasing or decreasing the pressure within the pressure chamber.

17 Claims, 8 Drawing Sheets

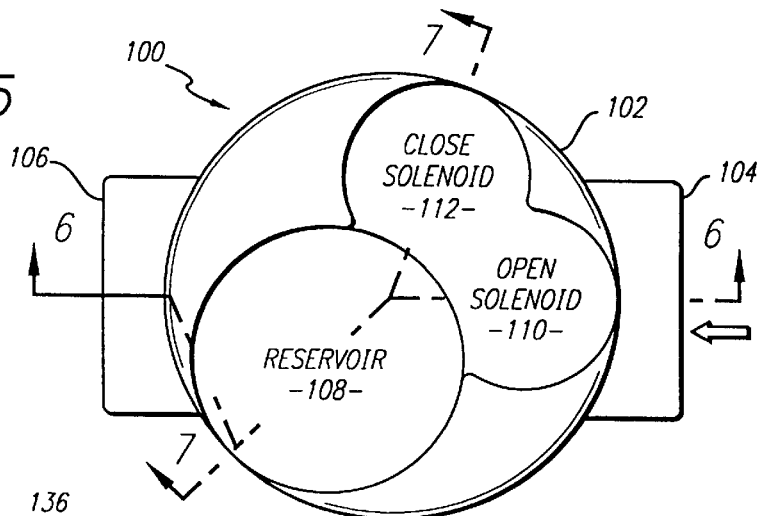
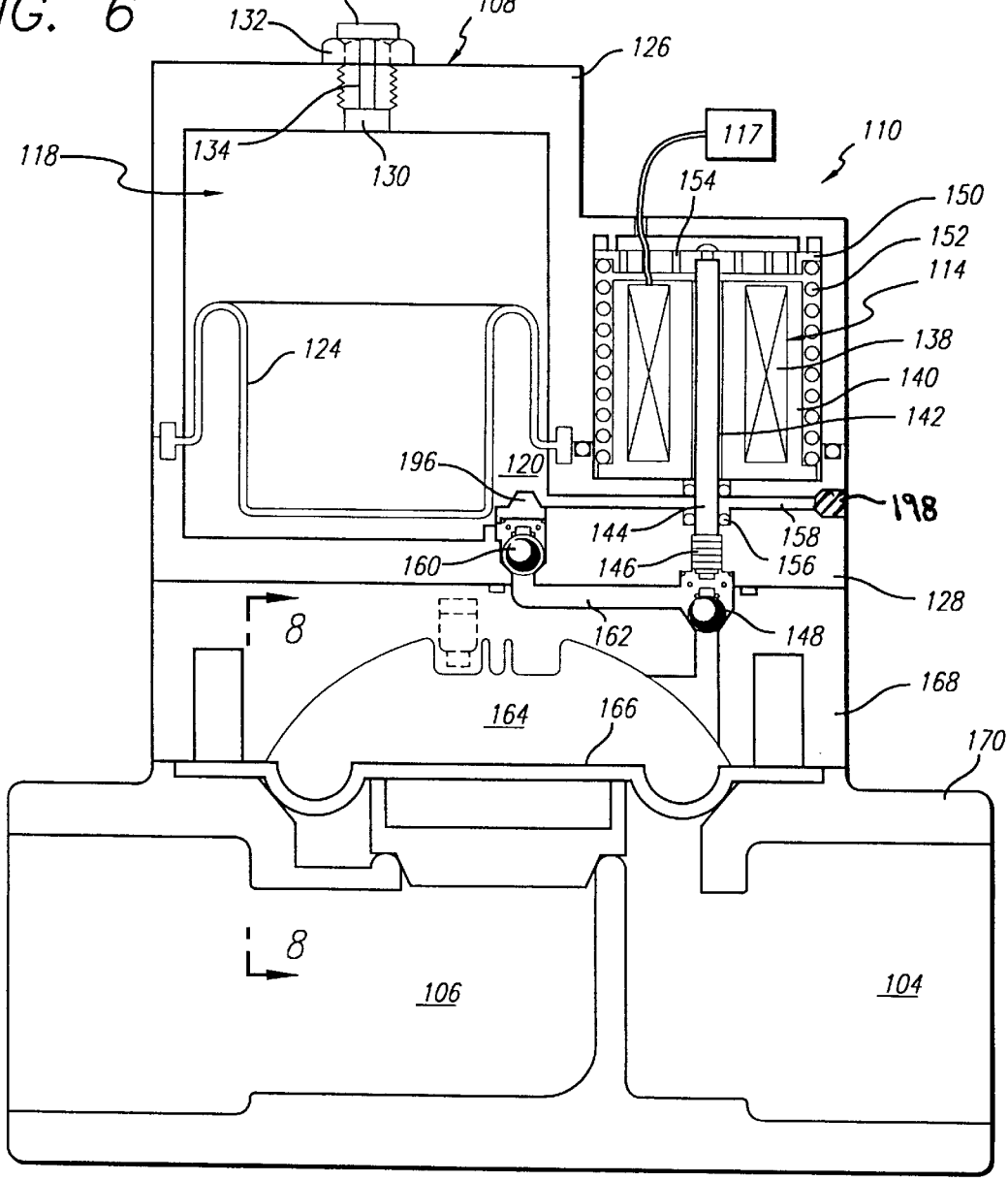

US 6,237,617 B1

ISOLATED PROPORTIONAL VALVE

BACKGROUND OF THE INVENTION

1. Field of the Invention

The present invention relates to a proportional fluid control valve.

2. Description of Related Art

The flow of fluids is typically controlled by a fluid control valve(s). A conventional fluid control valve has a spool or other similar element that is movable between two positions. The spool is typically moved into one position by a solenoid and pushed back to the original position by a spring or another solenoid. The spool is in either one of two positions. Consequently, the flowrate through the valve is limited to the two positions of the spool. By way of example, a two-way valve is either open or closed, so that the flowrate through the valve is either at a maximum value or zero.

It is sometimes desirable to vary the flowrate in a fluid system. For example, insecticides are sometimes sprayed from a moving vehicle. As the vehicle is driven about a field, it may be desirable to limit the range of the spray so that insecticide does not fall onto a certain area. As another example, it may be desirable to vary the range of a water stream emitted by a sprinkler system so that the water more completely covers an area adjacent to the sprinkler heads.

To change the fluid flowrate, some fluid systems have a variable speed pump motor that is controlled by an electronic controller. The controller can be programmed, or receive manual inputs, to change the speed of the motor and the pressure of the pump. The change in pump pressure varies the fluid flowrate within the system. Variable speed pumps are relatively expensive and provide relatively inaccurate and unproportional control of the fluid flowrate, particularly if multiple valves and nozzles are used in the system.

Another method for controlling fluid flowrate is to incorporate a flow restrictor within the system. The flow restrictor may contain a valve that varies and restricts the flow of fluid in the system. By way of example, a sprinkler system may contain a cam driven flow restrictor valve that is attached to a moving sprinkler head. The restrictor valve incrementally closes and reduces the range of the water stream after each revolution of the sprinkler head. The control of a mechanical flow restrictor is limited to the particular assembly installed. Any variation in the flowrate typically requires the adjustment of a spring or other mechanical element. This requires the operator to be available and in a position to adjust the restrictor valve. This may be undesirable, particularly if the operator must also perform another function such as driving a vehicle that sprays insecticides. It would be desirable to have an electronically controlled fluid valve that provides proportional control of a fluid.

SUMMARY OF THE INVENTION

The present invention comprises a proportional fluid control valve. The proportional valve includes a fluid valve that controls the flowrate of an output fluid. The fluid valve is coupled to a pressure chamber of the control valve. The position of the fluid valve, and the corresponding flowrate of the output fluid, can be varied by changing the pressure of a working fluid within the pressure chamber. The pressure within the pressure chamber can be increased by a piston that pumps working fluid from a reservoir to the chamber. The piston is coupled to a first solenoid and a spring that move the piston in a reciprocating pumping motion. The pressure of the working fluid within the pressure chamber can be decreased by opening a bleeder valve that allows working fluid to flow from the pressure chamber back to the reservoir. The bleeder valve is coupled to a second solenoid and a spring that open and close the valve. The first and second solenoids are connected to a controller that generates digital signals which energize the solenoids and move the piston and bleeder valve, accordingly. The controller can move the fluid valve and vary the output fluid flowrate by energizing the solenoids and either increasing or decreasing the pressure within the pressure chamber.

BRIEF DESCRIPTION OF THE DRAWINGS

The objects and advantages of the present invention will become more readily apparent to those ordinarily skilled in the art after reviewing the following detailed description and accompanying drawings, wherein:

FIG. 5 is a schematic of an alternate embodiment of a proportional valve of the present invention;

FIG. 6 is a cross-sectional view of FIG. 5, taken at line 6—6;

DETAILED DESCRIPTION OF THE INVENTION

Figure 1:
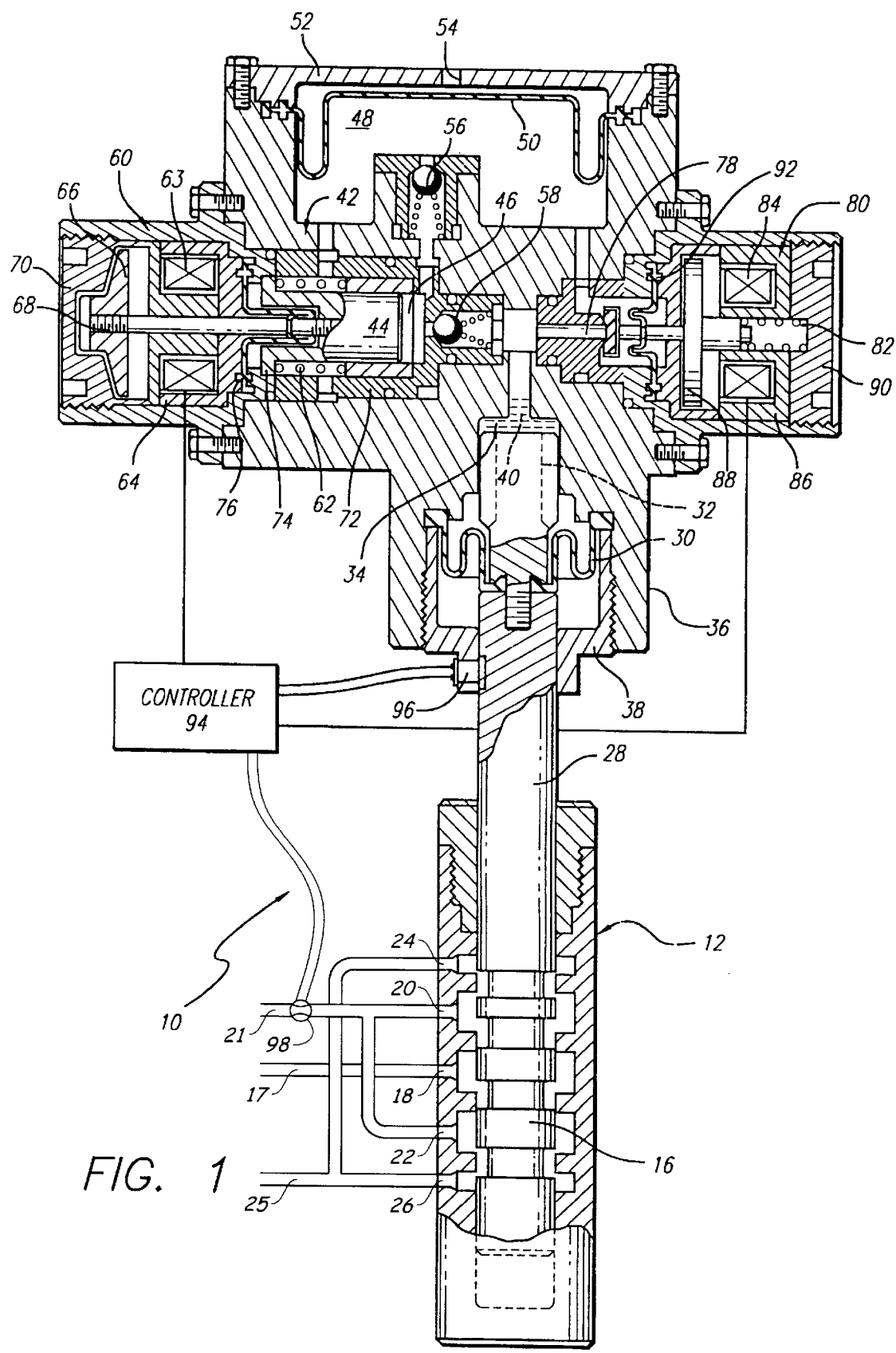
FIG. 1 is a cross-sectional view of a proportional fluid control valve of the present invention.

Referring to the drawings more particularly by reference numbers, FIG. 1 shows a proportional fluid control valve assembly 10 of the present invention. The valve assembly 10 includes a fluid valve 12 that controls the flow of an output fluid. By way of example, the fluid valve 12 may include a spool 16 that controls the flow of output fluid through ports 18,20,22,24,26. Port 18 is typically connected to a fluid supply 17 such as the output port of a pump. Ports 20 and 22 are typically connected to an output device 21 such as a spray nozzle or a sprinkler head. Ports 24 and 26 are typically connected to a return 25 for the supply fluid. The spool 16 can move between a first position and a second position. When the spool 16 is at its first position, shown in FIG. 2, port 18 is in fluid communication with ports 20 and 22 so that fluid can flow from the pump to the nozzle, sprinkler head, etc. When the spool 16 is at its second position, shown in FIG. 1, the ports 20 and 22 are in fluid communication with ports 24 and 26, respectively, so that fluid flows back to the return line. The valve 12 can also move to intermediate locations between the first and second positions. The intermediate locations vary the size of the openings between the ports and change the flowrate of fluid through the valve 12.

The spool 16 may have a shaft 28 that is attached to a diaphragm 30 by a support guide 32. The support guide 32 is located within a pressure chamber 34 of a valve housing 36. The diaphragm 30 may be captured by a retainer 38. The pressure chamber 34 contains a working fluid 40. The working fluid 40 is preferably a relatively incompressible liquid such as hydraulic oil. The pressure of the working fluid 40 within the pressure chamber 34 can be increased by a pump assembly 42. Increasing the working fluid pressure will expand the pressure chamber 34 and move the spool 16 towards its first position, shown in FIG. 2.

The pump assembly 42 includes a piston 44 that is located within a pump chamber 46 of the valve housing 36. The pump chamber 46 is in fluid communication with the pressure chamber 34 and a reservoir 48 of working fluid 40. The reservoir 48 is enclosed by a diaphragm 50. The diaphragm 50 can expand to compensate for any change of fluid volume in the system, because of temperature, etc. The reservoir 48 is enclosed by a cover 52 that is attached to the valve housing 36. The cover 52 may have an atmospheric vent port 54.

The flow of working fluid from the reservoir 48 to the pump chamber 46 is controlled by a first spring biased one-way check valve 56. The flow of working fluid from the pump chamber 46 to the pressure chamber 34 is controlled by a second spring biased one-way check valve 58. The first check valve 56 allows fluid to flow from the reservoir 48 to the pump chamber 46, but prevents fluid from flowing to the reservoir 48 from the pump chamber 46. Likewise, the second check valve 58 allows fluid to flow from the pump chamber 46 to the pressure chamber 34, but prevents fluid from flowing to the pump chamber 46 from the pressure chamber 34.

The piston 44 is moved to a first position within the pump chamber 46 by a first solenoid 60 and returned to a second position by a first spring 62. The first solenoid 60 includes a first coil 63 that is wrapped around a first pole 64. The first pole 64 is magnetically coupled to an armature 66. The armature 66 has a pin 68 that engages and moves the piston 44 to the first position. The solenoid 60 is enclosed by a cover 70 that is attached to the valve housing 36. The spring 62 is captured by a bushing 72 and a lip 74 in the piston 44. The pin 68 may be attached to a diaphragm 76 that seals the coil 62 of the solenoid 60.

The pressure within the pressure chamber 34 can be decreased by opening a bleeder valve 78 that allows fluid to flow from the chamber 34 to the reservoir 48. The bleeder valve 78 is connected to a second solenoid 80 and a second spring 82 which can move the valve 78 between an open position and a closed position. The second solenoid 80 has a second coil 84 wrapped around a second pole 86. The pole 86 is magnetically coupled to an armature 88 that is attached to the valve 78. The spring 82 is captured by a cover 90 that encloses the solenoid 80. The coil 84 may be sealed by a diaphragm 92 that is attached to the valve 78.

The first 60 and second 80 solenoids are energized with electrical signals provided by a controller 94. The controller 94 may be connected to a position sensor 96 that senses the position of the fluid valve 12. The system may also have a flowmeter 98 which senses the flowrate of the output fluid. It will be appreciated that the flowmeter 98 may be placed to sense the flowrate of the output fluid other than as shown in the exemplary embodiment of FIGS. 14 since the output fluid flows through ports 18,20,22,24,26. The controller 94 may contain a microprocessor which can be programmed to vary the position of the valve 12 and the flow of the output fluid in accordance with operating instructions. The controller 92 may also have input buttons, switches, etc. which allow an operator to directly control the flowrate of the output fluid. By way of example, the proportional valve 10 may control the flow of water through a spray nozzle. The operator can directly control and vary the flow of fluid through the nozzle by providing inputs to the controller 94 to move the position of the spool 16.

In operation, the controller 94 can move the spool 16 and vary the flow of the output fluid by providing power to the first solenoid 60. The power may be provided as a short digital pulse sufficient to move the armature 66 into contact with the pole 64.

Figure 2:
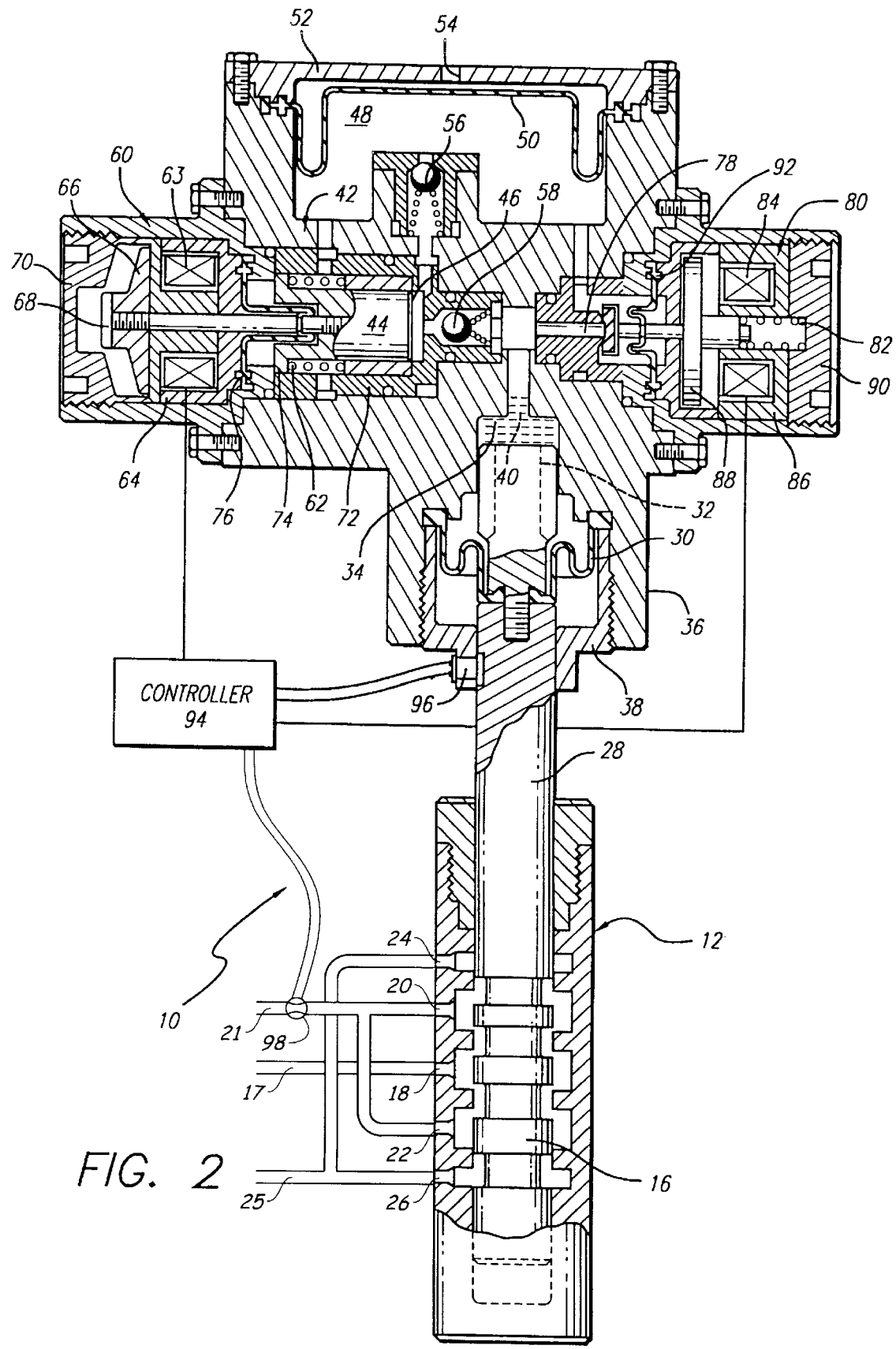
FIG. 2 is a cross-sectional view similar to FIG. 1, showing a piston pumping working fluid into a pressure chamber to move a spool.

As shown in FIG. 2, the armature pin 68 moves the piston 44 to its first position and forces working fluid through the second check valve 58. The flow of working fluid expands the pressure chamber 34 and moves the spool 16 towards its first position.

Figure 3:
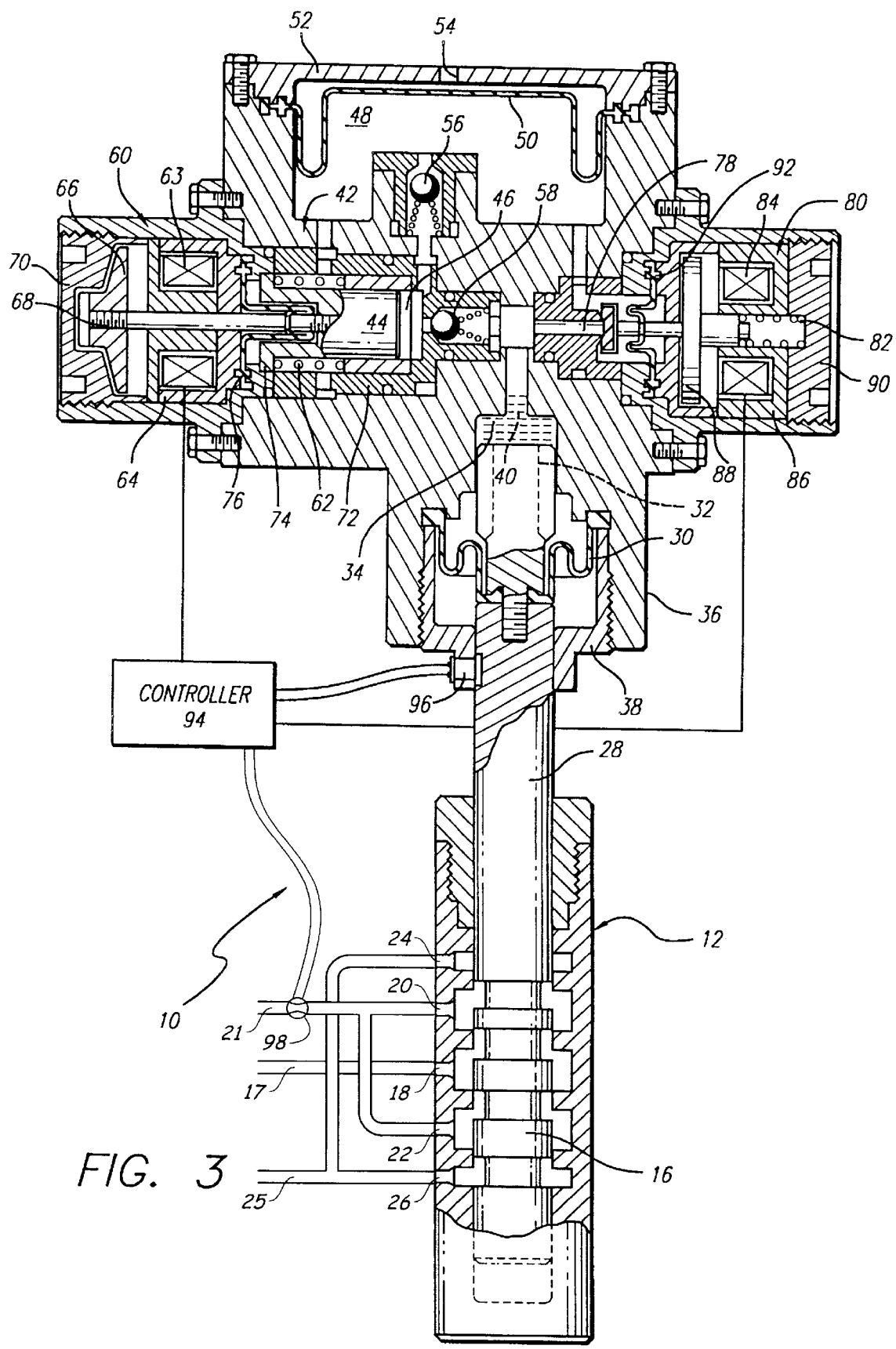
FIG. 3 is a cross-sectional view similar to FIG. 2, showing the piston moved to a return position.

As shown in FIG. 3, when power is terminated to the solenoid 60, the spring 62 pushes the piston 44 back to its second position. Movement of the piston 44 expands the pump chamber 46 and draws fluid from the reservoir 48 through the first check valve 56 and into the pump chamber 46. The solenoid 60 is again energized to push the working fluid from the pump chamber 46 to the pressure chamber 34. The cycle of energizing and de-energizing the solenoid 60 can be repeated to pump working fluid into the pressure chamber 34 and move the spool 16 to a desired position. The controller 94 can energize the solenoid 60 to pump fluid into the pressure chamber 34 until the spool 16 has reached a desired position and/or the output fluid has a desired flowrate. The feedback devices can provide feedback signals to the controller 94 to sense the state of the valve 12.

Figure 4:
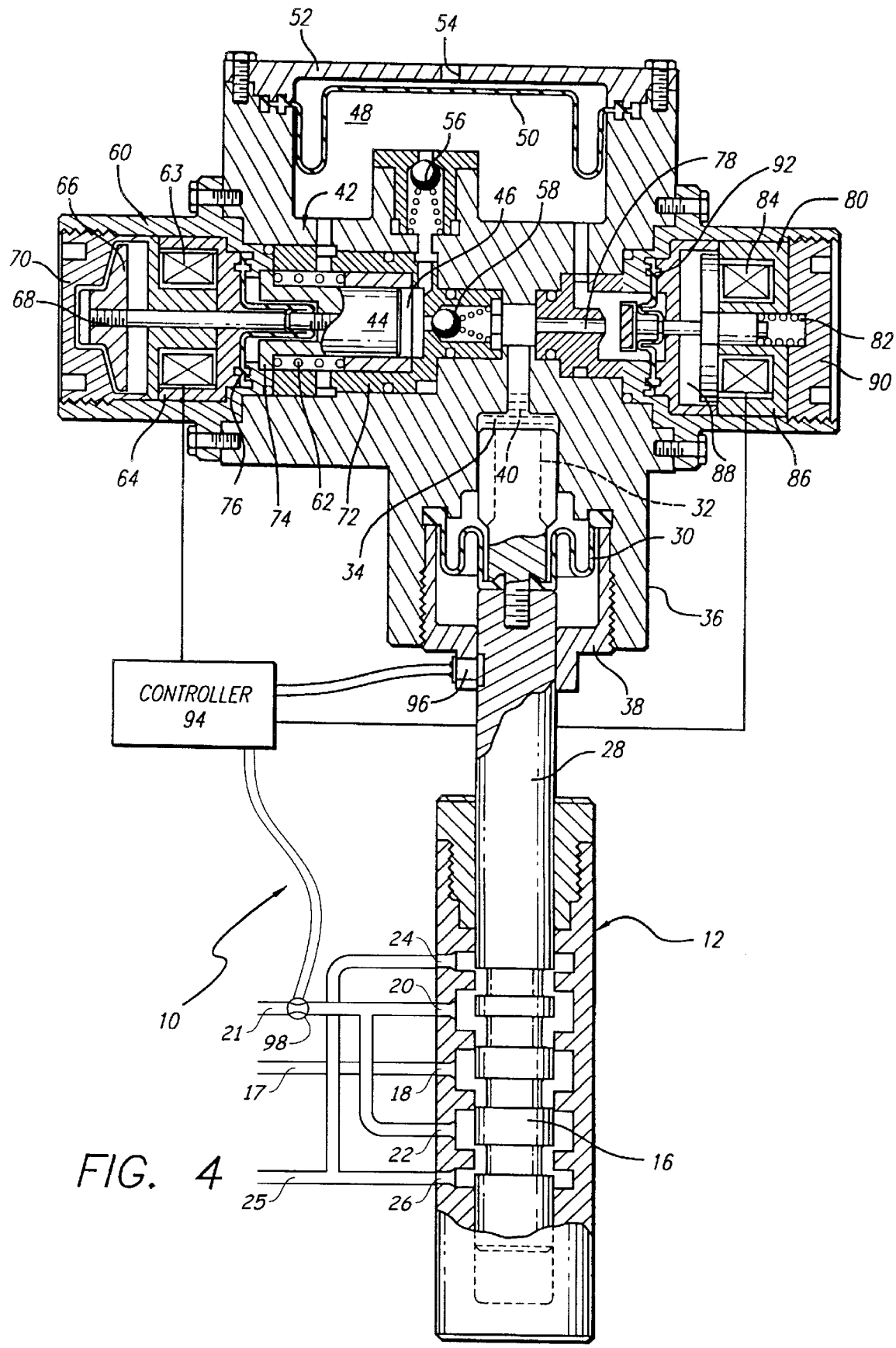
FIG. 4 is a cross-sectional view similar to FIG. 1, showing a bleeder valve in an open position.

As shown in FIG. 4, the controller 94 can move the spool 16 in the opposite direction by energizing the second solenoid 80. The energized second solenoid 80 moves the bleeder valve 78 to its open position so that working fluid can flow from the pressure chamber 34 to the reservoir 48. The stiffness of the diaphragm 30 functions as a spring which contracts the pressure chamber 34 and moves the spool 16. The bleeder valve 78 can be maintained in an opened position until the spool 16 has reached a desired position and/or the flowrate has reached a desired level. Power is terminated to the second solenoid 80, wherein the spring 82 closes the bleeder valve 78. To provide a finer resolution of valve control, the controller 94 may cycle the bleeder valve 78 between the open and closed positions with short digital pulses to incrementally move the spool 16.

The controller 94 may provide power to the solenoids in relatively short intervals to closely control the movement of the spool 16. The movement of the spool 16 can be linearly controlled to provide a proportional control of the output fluid.

FIG. 5 shows another proportional valve 100 of the present invention. The valve 100 has a housing 102 with a fluid inlet 104 and a fluid outlet 106. The housing 102 also includes a reservoir compartment 108, a first solenoid compartment 110 and a second solenoid compartment 112.

Figure 7:
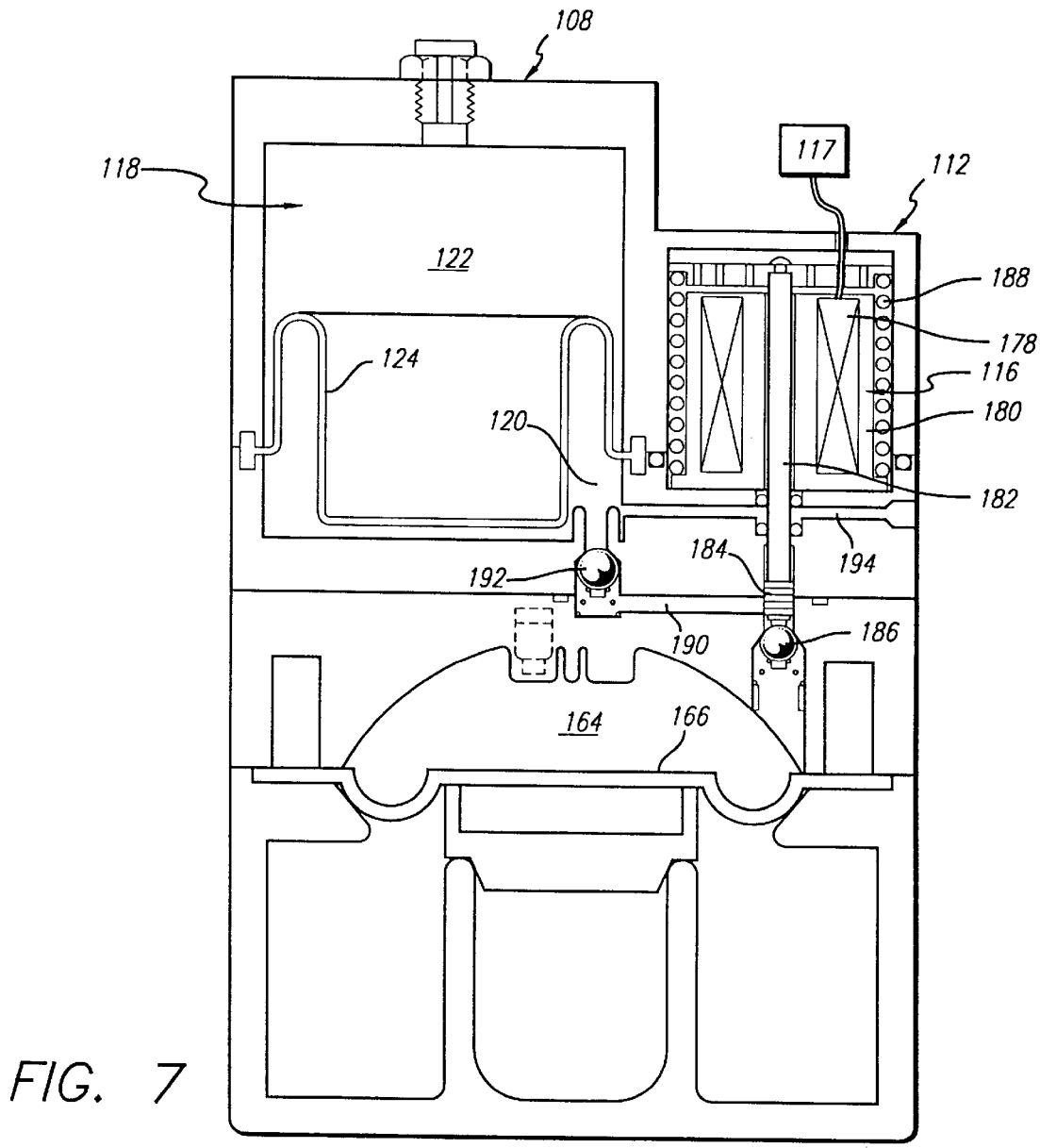
FIG. 7 is a cross-sectional view of FIG. 5, taken at line 7—7.

As shown in FIGS. 6 and 7, the first 110 and second 112 solenoid compartments contain first 114 and second 116 solenoids, respectively. Generally speaking, the first solenoid 114 opens the valve 100 and the second solenoid 116 closes the valve 100. The solenoids are connected to a controller 117 that can energize and deenergize the solenoids, accordingly.

The reservoir compartment 108 contains a reservoir 118 that has a first chamber 120 separated from a second chamber 122 by a reservoir membrane 124. The membrane 124 has bellows so that the membrane 124 can readily expand and retract. The housing 102 includes a cap 126 and a valve plate 128 that capture and secure the reservoir membrane 124. The integration of the cap 126 also simplifies the assembly of the solenoids and reservoir. The cap 126 has a vent port 130 that allows fluid communication between the second chamber 122 and the ambient. Screwed into the port 130 is a vent bolt 132 that has a vent bore 134. A pin 136 is normally pressed into the bore 134. The pin 136 is preferably constructed from brass and has a tight fit with the bolt 132, so that the pin 136 remains in place even when the second chamber 122 is pressurized. The first chamber 120 is normally filled with a hydraulic fluid, the second chamber 122 typically contains a pressurized gas such as air.

The first solenoid 114 has a first coil 138 within a first magnetic core 140. The magnetic core 140 has a bore 142 that allows a piston rod 144 to extend therethrough. The rod 144 has a piston 146 at one end that can engage a first spring loaded ball valve 148. The rod 146 is also attached to a spring plate 150, which captures a first spring 152. The spring plate 150 has a plurality of passages 154 that allow fluid to flow across the plate 150. The passages 154 prevent fluid from becoming trapped between the cap 126 and plate 150, and impeding the movement of the rod 144. Within the valve plate 128 is a pair of bushings 156 that guide the rod 144, so that the piston 146 moves in a linear manner. The bushings 156 each have slits that help define a first fill channel 158 that provides fluid communication between the first chamber 120 and the ambient. The channel 158 also allows any fluid that leaks past the piston 146 to flow back into the first chamber 120.

A second spring loaded ball valve 160 controls the flow of hydraulic fluid between the first chamber 120 and a first passage 162. The first valve 144 controls the flow of fluid between the first passage 162 and a pressure chamber 164. The valve chamber 164 is partially defined by a valve membrane 166 that controls the flow of working fluid from the inlet 104 to the outlet 106. The housing 102 includes a chamber plate 168 and a port section 170 that capture and secure the ends of the membrane 160. The chamber plate 168 is also attached to the valve plate 128. The two piece design of the chamber and valve plates, also provides an easy means of assembling the ball valves.

Figure 8:
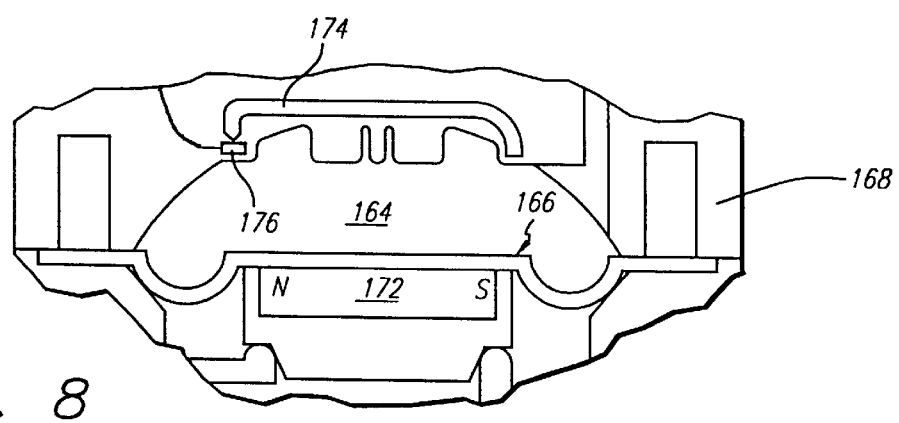
FIG. 8 is a section view of FIG. 6, taken at line 8—8.

As shown in FIG. 8, the valve membrane 166 contains a magnet 172, which is attracted to an iron rod 174 located within the chamber plate 168. Located next to the rod 174 is a Hall effect sensor 176, that can sense the magnetic flux of the magnet 172. The sensor 176 provides a voltage output that is dependent upon the amount of magnetic flux flowing through the sensor 176. Generally speaking, as the valve membrane 166 and magnet 172 move toward the rod 174, the output voltage increases. The sensor 176 can be connected to the controller 117, such that the sensor 176 provides feedback on the location of the valve membrane 166 relative to the rod 174. In the preferred embodiment, one end of the rod 174 is narrowed to increase the flux density of the magnetic field as it flows past the sensor 176. Such a configuration reduces the sensitivity requirement of the sensor 176.

The second solenoid 116 has a second coil 178 within a second magnetic core 180. Extending through the second core 180 is a second piston rod 182, which has a second piston 184 that can engage a third spring loaded ball valve 186. The rod 182 is also connected to a second spring 188 that biases the piston 184 away from the valve 186. The third ball valve 186 controls the flow of fluid between a second passage 190 and the valve chamber 164. Also incorporated is a fourth spring loaded ball valve 192, that controls the flow of fluid between the second passage 190 and the first chamber 120. The valve plate 128 has a second fill channel 194, that provides fluid communication between the first chamber 120 and the ambient.

The first chamber 120 is preferably filled with hydraulic fluid by pouring the fluid into the first and/or second channels 158, 194. The solenoids are activated to open the ball valves, so that the fluid flows into the passages 162 and 190, and the valve chamber 164. The housing 102 is tipped so that the air becomes trapped by the membrane 124. As shown in the embodiment of FIG. 6, to facilitate the removal of the air from the passages, the second ball valve 160 has a spring captivator 196 welded to the valve plate 128. In addition to capturing the spring of the ball valve, the captivator 196 also traps the air within the bellows portion of the membrane, so that the air is directed out of the fill channel 158.

The pin 136 is removed and the second chamber 122 is pressurized to drive the entrapped air out the valve 100 through the fill channels 158, 194. When the air is completely removed from the passages and chambers, the pin 136 is reinserted and vent plugs 198 are welded into the fill channels 158 to seal the hydraulic system.

Figure 9:
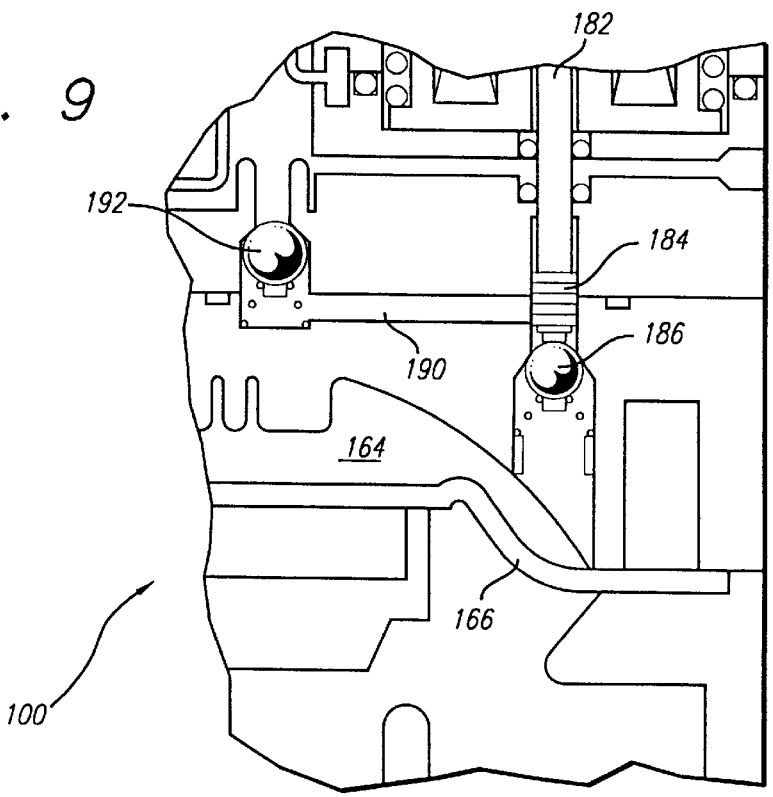
FIG. 9 is an enlarged view of the valve of FIG. 7 in a normally open position.

FIGS. 9–13 show the typical operation of the valve 100. FIG. 9 depicts the valve 100 after the hydraulic system has been filled. The valve membrane 166 is attracted toward the rod 182 into an open position, whereby working fluid can flow from the inlet 104 to the outlet 106. The second solenoid 116 is normally energized, so that the second piston 184 is adjacent to the third ball valve 186.

Figure 10:
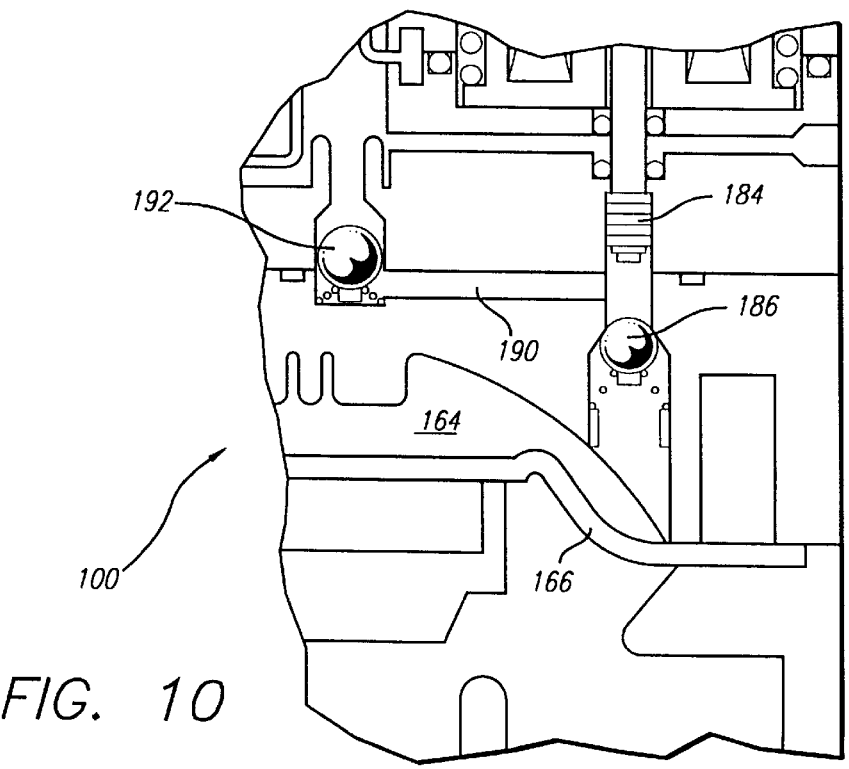
FIG. 10 is an enlarged view similar to FIG. 9, showing a solenoid moving a piston to induce fluid flow into a passage.

As shown in FIG. 10, to close the valve the second coil 178 is deenergized by the controller 117. The second spring 188 then pulls the second piston 184 away from the ball valve 186. The movement of the piston 184 induces a pressure drop in the second passage 190, which creates a pressure differential across the fourth ball valve 192. The pressure differential opens the ball valve 192, such that fluid flows from the first chamber 120 into the second passage 190. This fluid flow continues until the pressure balances and the ball valve 192 moves into a closed position.

Figure 11:
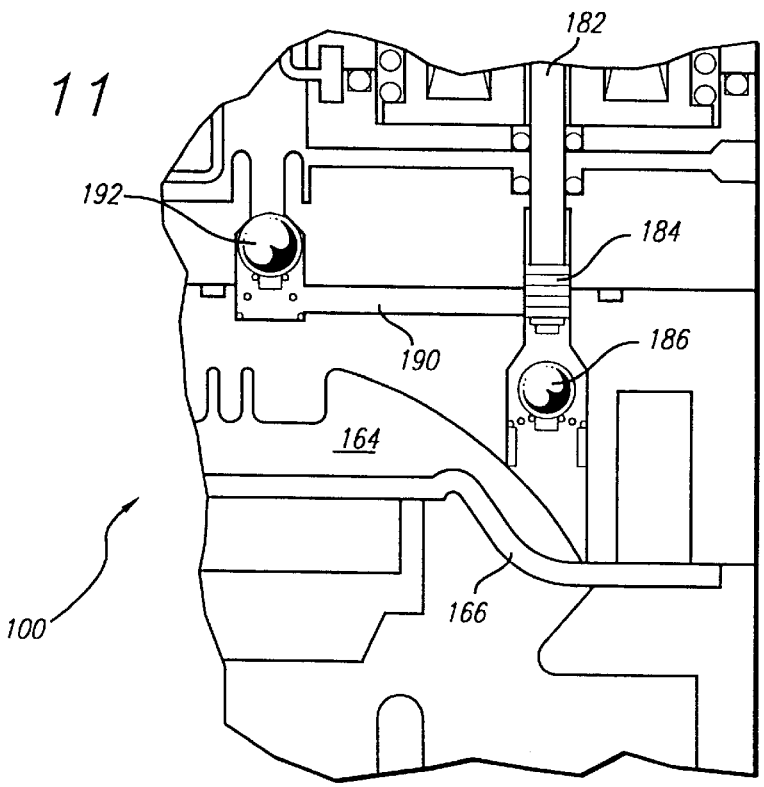
FIG. 11 is an enlarged view similar to FIG. 9, showing a solenoid moving the piston to push fluid into a valve chamber.

As shown in FIG. 11, the coil 178 is then energized by the controller 117, forcing the piston 184 toward the third ball valve 186. The movement of the piston 184 pushes the fluid past the third ball valve 186 and into the valve chamber 164. This cycle is repeated, wherein the valve chamber 164 becomes pressurized and moves the valve membrane 166 away from the rod 174. The sensor 176 provides feedback to the controller 117 on the position of the membrane 166. The controller 117 ceases to cycle the solenoid 116 when the membrane 166 reaches a desired position.

The valve chamber 164 can be pressurized until the valve membrane 166 is seated into a closed position, wherein the working fluid cannot flow between the inlet 104 and outlet 106. During the pumping process, the first solenoid 114 is energized, so that the first piston 146 engages the first ball valve 148 to prevent hydraulic fluid from flowing through the first passage 162 back into the first chamber 120.

Figure 12:
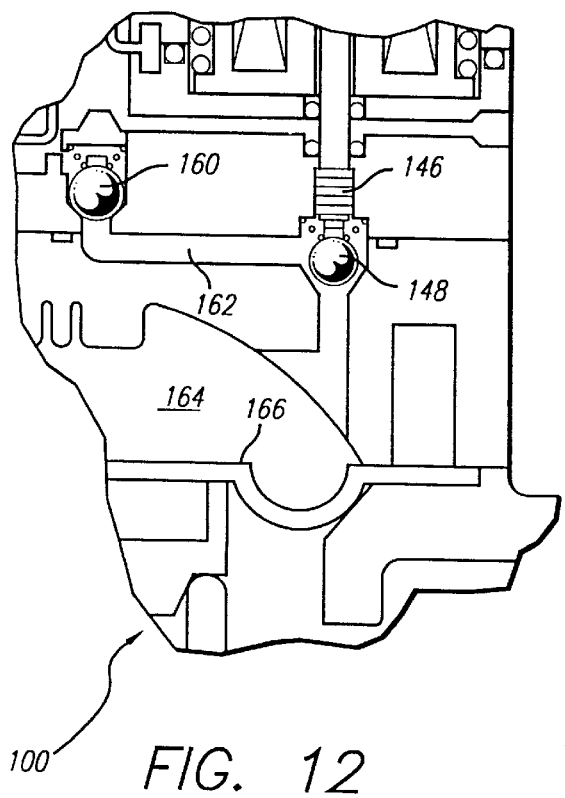
FIG. 12 is an enlarged view similar to FIG. 9, showing a second solenoid moving a second piston such that fluid flows from the valve chamber into a passage.
Figure 13:
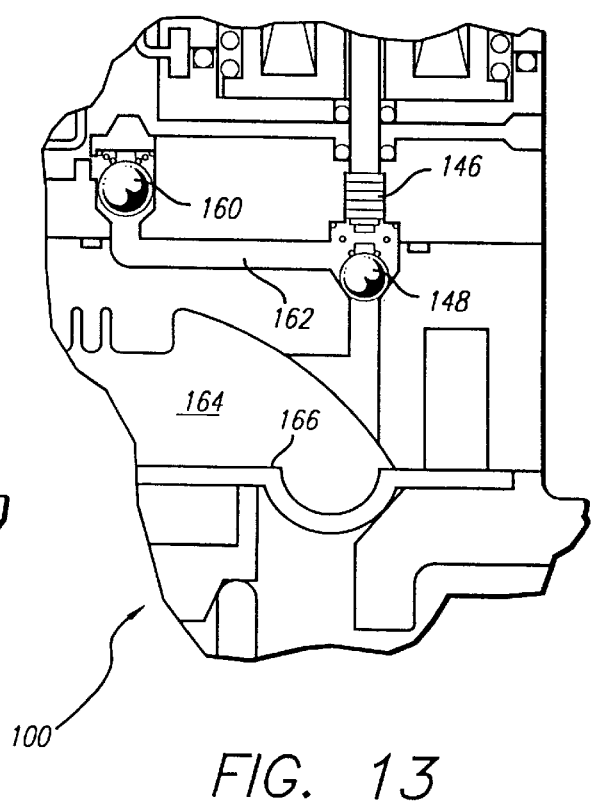
FIG. 13 is an enlarged view similar to FIG. 9 showing the piston being moved so that the fluid is pushed into a reservoir.

To open the valve membrane 166, the first solenoid 114 is deenergized, wherein the first spring 152 pulls the first piston 146 away from the first ball valve 148. As shown in FIG. 12, the movement of the piston 146 induces a pressure differential across the ball valve 148, opening the valve 148 such that fluid flows from the valve chamber 164 to the first passage 162. The fluid flow continues until the pressures are balanced, whereby the first ball valve 148 returns to the seated closed position. As shown in FIG. 13, the first coil 138 is then reenergized, pushing the piston 146 toward the first valve 148. The piston 146 movement forces the fluid, through the second ball valve 160 and into the first chamber 120. This cycle is repeated, pumping hydraulic fluid out of the valve chamber 164 and reducing the pressure therein. As the chamber 164 pressure decreases, the magnetic force of the magnet 172 pulls the valve membrane 166 toward the rod 174. When working fluid is introduced to the valve 100, the pressure of the working fluid also pushes the valve membrane 166 toward the rod 174. The sensor 176 provides feedback to sense the position of the membrane 166 relative to the rod 174.

The controller 117 may contain various control means to regulate the flow of working fluid through the valve. For example, the controller 117 may include a timer that activates the first solenoid 114 and opens the valve 100 at a predetermined time. After a certain time interval, the second solenoid 116 is then activated to close the valve 100. In addition to sensing the relative position of the valve membrane 166 relative to the rod 174, the sensor 176 provides feedback on when the valve is fully open or closed, so that the solenoids can be deactivated. This prevents the solenoids from continually running even when the membrane 166 has moved the maximum distance.

The present invention therefore provides a proportional valve that has a separate isolated hydraulic system that opens and closes the valve. The separate system does not become contaminated by the working fluid like valves typically found in the art. The present valve can also incorporate large valve orifices on the order of 4 inches. The larger orifices greatly reduce the pressure drop through the valve, resulting in improved fluid efficiency.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A proportional fluid control system that controls a fluid valve, comprising:
    a valve housing which has a pressure chamber coupled to the fluid valve, said pressure chamber adapted to contain a working fluid that has a pressure;
    a sensor to sense a position of the fluid valve;
    a comparator to compare the sensed position to a desired position; and,
    a pressure control system including
        a solenoid actuated pump to receive a first digital pulse responsive to the comparator, to increase a pressure of the pressure chamber to move the fluid valve in a first direction, and
        a solenoid actuated bleeder valve to receive a second digital pulse responsive to the comparator, to decrease the pressure of the pressure chamber to move the fluid valve in a second direction opposite to said first direction.

2. The system of claim 1, wherein said solenoid actuated pump includes a first piston that is located within a pump chamber and is coupled to a first solenoid and a first spring, said first piston is moved to a first position by said first solenoid and to a second position by said spring, wherein said first piston movement increases the pressure of working fluid within said pressure chamber.

3. The system of claim 2, wherein said pressure control system includes a reservoir adapted to contain working fluid in fluid communication with said pump chamber and said pressure chamber.

4. The system of claim 3, wherein said pressure control system includes a first one-way valve that controls the flow of working fluid from said reservoir to said pump chamber and a second one-way valve that controls the flow of working fluid from said pump chamber to said pressure chamber.

5. The system of claim 3, wherein said bleeder valve controls a flow of working fluid from said pressure chamber to said reservoir.

6. The system of claim 5, wherein said bleeder valve is moved to an open position by a second solenoid and moved to a closed position by a second spring, wherein said bleeder valve allows fluid communication between said pressure chamber and said reservoir when in the open position to decrease the pressure of the working fluid within said pressure chamber.

7. The system of claim 6, wherein said pressure control system includes a diaphragm that is coupled to said pressure chamber and the fluid valve, to bias and move the fluid valve when the pressure of the working fluid within said pressure chamber decreases.

8. The valve of claim 1, wherein the sensor is a flowmeter to sense a flowrate of a fluid flow from the fluid valve.

9. A proportional fluid control valve, comprising:
    a fluid valve;
    a sensor to sense a position of the fluid valve;
    a comparator to compare the sensed position to a desired position;
    a controller operable to provide one of a first digital pulse and a second digital pulse responsive to the comparator to control the movement of said fluid valve;
    a valve housing which has a pump chamber, a reservoir and a pressure chamber, said pressure chamber is coupled to said fluid valve and adapted to contain a working fluid that has a pressure, the pressure chamber moving the fluid valve responsive to the pressure of the working fluid to provide a proportional control of a fluid flow;
    a first one-way valve that controls a flow of working fluid between said reservoir and said pump chamber;
    a second one-way valve that controls a flow of working fluid between said pump chamber and said pressure chamber;
    a pump piston located within said pump chamber;
    a first electrical actuator operable to move said pump piston to a first position in response to the first digital pulse;
    a first spring operable to move said piston to a second position, wherein said piston movement pumps working fluid from said reservoir to said pressure chamber to increase the pressure within said pressure chamber and move said fluid valve;
    a bleeder valve that controls a flow of working fluid from said pressure chamber to said reservoir, a second electrical actuator operable to move said bleeder valve to an open position in response to the second digital pulse, wherein working fluid flows from said pressure chamber to said reservoir to decrease the pressure within said pressure chamber;

a biasing member that is coupled to said pressure chamber and said fluid valve and moves said fluid valve when the pressure of the working fluid within said pressure chamber decreases; and, a second spring that biases said bleeder valve to a closed position to prevent fluid communication between said pressure chamber and said reservoir.

10. The valve of claim 9, wherein said biasing member is a diaphragm.

11. The valve of claim 9, wherein the fluid valve includes:

a valve body having a first port, a pair of second ports disposed on opposing sides of the first port, and a pair of third ports disposed on opposing sides of the pair of second ports; and a spool continuously movable within the valve body between a first position and a second position, the spool in the first position allowing fluid communication between the first port and the pair of second ports, the spool in the second position allowing fluid communication between the pair of second ports and the pair of third ports.

12. The valve of claim 9, wherein the sensor is a flowmeter to sense a flowrate of the fluid flow.

13. A method for proportionally controlling a fluid valve that is coupled to a pressure chamber, comprising:

sensing a position of the fluid valve;

comparing a the sensed position to a desired position;

responding to the comparing of the sensed position by supplying one of a first digital pulse to a solenoid actuated pump to increase a pressure of the pressure chamber to move the fluid valve in a first direction, and a second digital pulse to a solenoid actuated bleeder valve to decrease the pressure of the pressure chamber to move the fluid valve in a second direction opposite to said first direction.

14. A valve system comprising:

a fluid valve continuously moveable between a first position and a second position;

a hydraulic actuator including
a diaphragm coupled to the fluid valve to position the valve between the first position and the second position,
an electrically actuated pump to pump a working fluid to the diaphragm to move fluid valve toward the first position, and
an electrically actuated bleed valve to drain the working fluid from the diaphragm to move fluid valve toward the second position;

a sensor coupled to the fluid valve, the sensor to produce a sensed position signal in response to a position of the fluid valve;

a comparator coupled to the sensor, the comparator to compare the sensed position signal to a desired position signal, the comparator to produce a comparison signal;

a controller coupled to the comparator, the controller to send a first digital pulse to the pump if the comparison signal indicates that the fluid valve should move toward the first position, the controller to send a second digital pulse to the bleed valve if the comparison signal indicates that the fluid valve should move toward the second position.

15. The valve system of claim 14, further comprising a biasing member coupled to the fluid valve to urge the fluid valve toward the second position.

16. The valve system of claim 15, wherein the biasing member is the diaphragm.

17. The valve of claim 14, wherein the sensor is a flowmeter to sense a flowrate of a fluid flow from the fluid valve.

* * * * *